July 7, 1959  K. R. BIXBY  2,893,560
SCREEN
Filed June 21, 1956  2 Sheets-Sheet 1
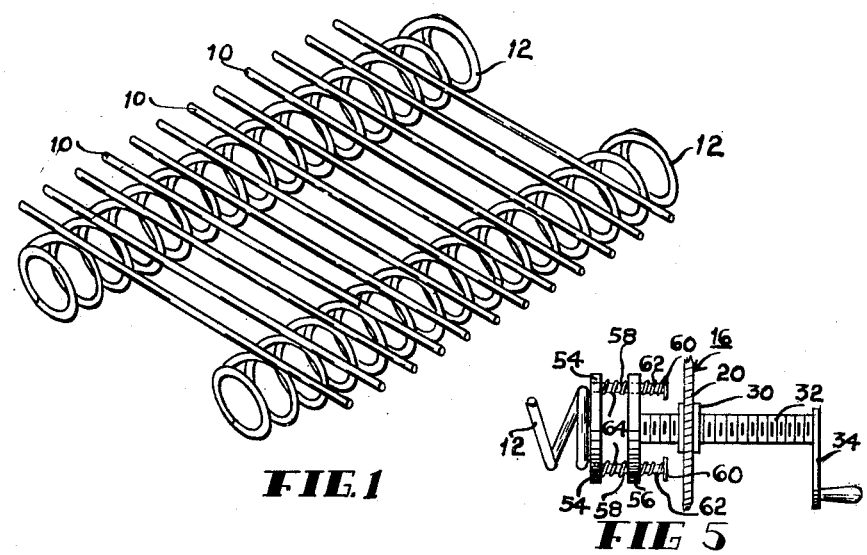
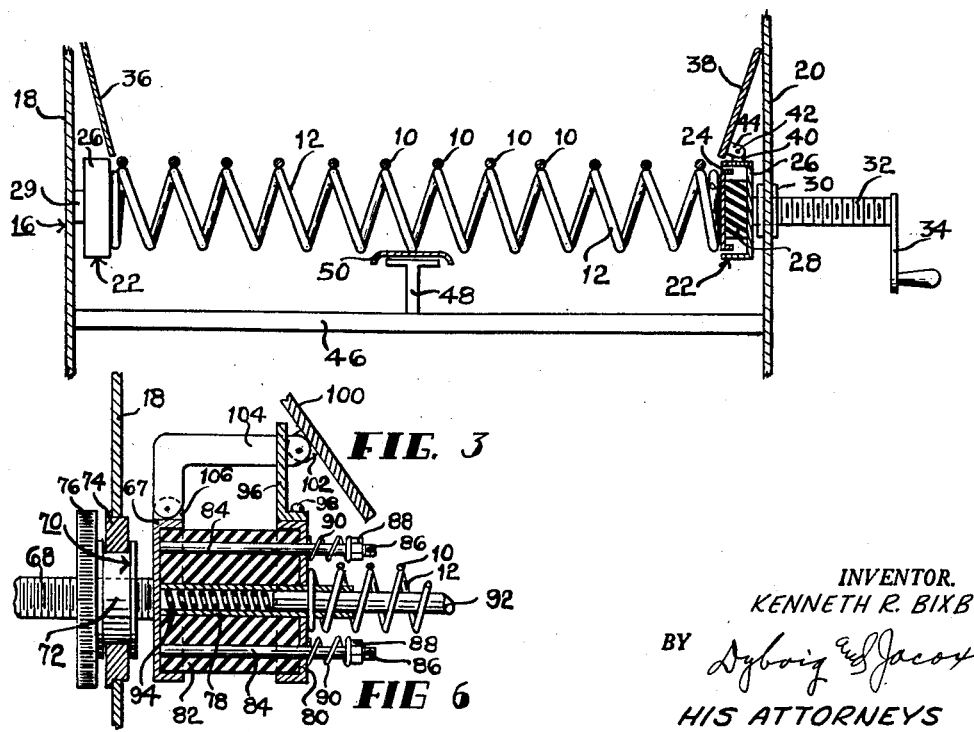
INVENTOR.
KENNETH R. BIXBY
BY Dybvig and Jacox
HIS ATTORNEYS July 7, 1959 K. R. BIXBY 2,893,560
SCREEN
Filed June 21, 1956 2 Sheets-Sheet 2

INVENTOR.
KENNETH R. BIXBY
BY
HIS ATTORNEYS

# United States Patent Office 2,893,560
Patented July 7, 1959

2,893,560

SCREEN

Kenneth R. Bixby, Galesburg, Ill.

Application June 21, 1956, Serial No. 592,831

9 Claims. (Cl. 209—394)

This invention relates to a screen and more particularly to a non-blinding screen suitable for use in grading and sifting devices, although not necessarily so limited.

When fibrous, stringy or tacky materials are passed through a grading or sifting screen, a condition known as "blinding" frequently develops, and, in some cases, the tendency of particular materials to blind a screen is so great as to preclude the use of ordinary screens in a screening process involving these materials. The term blinding refers to the clogging of the foramina or openings of the screen by the material being screened. The efficiency of a particular screen for screening a particular substance will be in inverse proportion to the tendency of the screen to blind or clog.

In the past, efforts to reduce the tendency of a screen to blind have included, for example; placing freely movable ringlets on the cross bars of the screen, as taught in my United States Letters Patent No. 2,722,314. The present invention is a novel approach to the problem, yielding a highly adaptable non-blinding screen.

One object of the present invention is to provide a non-blinding screen formed from a plurality of parallel bars yieldingly supported in spaced relation.

Another object of this invention is to provide a non-blinding screen of variable mesh, whereby one screen may be employed, where heretofore many screens of varying mesh or porosity were required.

Another object of this invention is to provide a screen wherein the porosity of the screen may be varied longitudinally to provide a porosity gradient across the width of the screen.

Still another object of the present invention is to provide a non-blinding screen having no tie bars or other supporting elements in the plane of the spaced screening elements, with the result that the effects of degradation of the product screened thereby are materially reduced.

A further object of this invention is to provide a screen which may be developed or formed into a wide variety of shapes to accommodate the many requirements of industrial screening devices.

Other objects and advantages reside in the construction of parts, the combination thereof, the mode of operation and the method of manufacture, as will become more apparent from the following description.

In the drawings Figure 1 is a perspective view of the screen of this invention.

Figure 3 is a sectional view with parts broken away, taken substantially along the line 3—3 of Figure 2.

Figure 5 is a sectional view of a modified support block for the screen of this invention.

Figure 6 is a sectional view of a further modification of the support means for the screen of this invention.

Figure 4:
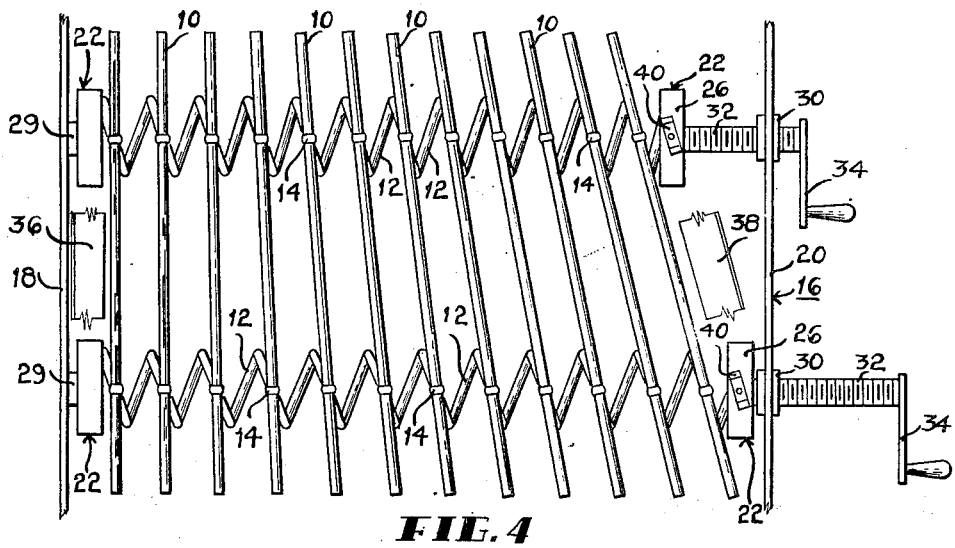
Figure 4 is a plan view of the screen and frame of Figure 2 illustrating a special adaptation of the screen.

Referring to the drawings in detail, the screen of this invention includes a plurality of spaced rods 10 arranged in substantially parallel relation and supported by transversely extending springs 12. The spaced rods 10 are secured to the outer perimeter of each spring 12 at points spaced one convolution apart, the distance between rods being equal to the pitch of one convolution of the springs. Although it is not essential that the several springs 12 be identical, such construction is preferable. It is to be understood that although only two springs 12 are illustrated, the screen may include many additional springs 12.

For most applications, as will be described hereafter, it is sufficient to weld the rods 10 to the springs 12. However, for maximum adaptability of the screen, the rods 19 are slidably and pivotally secured to the springs 12. This is accomplished by providing an eyelet on each convolution of each spring, as shown at 14 in Figure 4. The eyelet 14 may be pivotally secured to the springs by riveting, or may be integral with the springs, having been formed therewith. In the latter case, each eyelet 14 is of sufficient internal diameter to permit pivotal motion of the rod 10 passing therethrough.

Other means may be employed for pivotally securing the rods 10 to the springs 12. For example, a rivet may be driven through each rod 10 and anchored to the spring 12, the rivet fitting loosely in the rod 10.

In the screen illustrated, the spaced rods 10 occupy parallel positions all in the same plane when the springs 12 are relaxed or unstrained. Due to the yieldable nature of the springs, however, the plane occupied by the rods 10 may be regarded as a developable plane. For example, one or more of the springs may be arched to provide a crowned screen. By bending the springs into circular form, a cylindrical screen surface is obtained. It is apparent that the screen may assume a wide variety of shapes.

Figure 2:
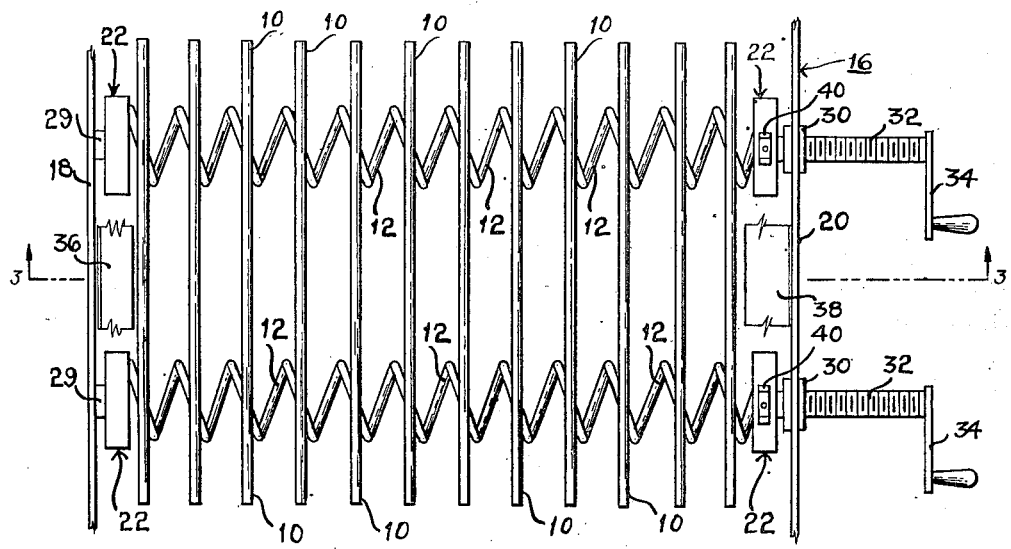
Figure 2 is a plan view of the screen mounted in a suitable adjustable frame.

For the purposes of illustrating the applicability of the screen, a suitable supporting frame 16 is shown in Figures 2, 3 and 4. The frame 16 includes parallel side members 18 and 20 supported in fixed spaced relation by suitable end plates, not shown. The frame 16 is adapted to support a screen between the side members 18 and 20, the screen including a plurality of spaced parallel springs 12 disposed normal to the members 18 and 20.

The ends of the springs 12 are each provided with support blocks 22. As shown in section in Figure 3, each support block includes a pair of opposed concentric telescopically arranged cup members 24 and 26. The cup members are support in spaced relationship by a resilient pad 28, the pad being secured to and extending between the bases of the opposed cup members. The inner cup member 24 is welded, or otherwise secured, to the end of the spring 12 and the outer cup member 26 is supported by one of the side members 18 or 20. Those support blocks 22 adjacent the member 18 are welded, or otherwise secured to, a short shaft 29 projecting from the side member 18. The support blocks 22 adjacent the side member 20 are adjustably supported in the following manner.

A plurality of internally threaded nuts 30 are secured in fixed spaced relation in the side member 20. Threadedly engaging each nut 30 is a threaded shaft 32 provided with a handle 34 on one end thereof. The outer cup members 26 of the support blocks 22 adjacent the side member 20 are rotatably secured to the ends of the shaft 32 opposite the handles 34. The arrangement of parts is such that the spacing between the shafts 32 equals the spacing between the springs 12 of the screens and the springs 12 are supported in parallel relation by the frame 16.

Suitable baffles 36 and 38 are provided adjacent the side members 18 and 20, respectively, to guide the material to be graded or sifted along the screen, the material flowing parallel to the baffles 36 and 38 in most applications. To provide for adjustment of the screen porosity or mesh, as will be described subsequently, the baffle 38 is pivotally secured to the outer cup member 26 of the support blocks 22 adjacent the side member 20. Each said outer cup member 26 is provided with a U-shaped bracket 40 supporting a pin 42. The baffle 38 is provided with a plurality of spaced U-shaped brackets 44, there being one U-shaped bracket aligned with and journalled upon each pin 42. The baffle is thus pivotally secured relative to the screen supported by the frame 14. In some applications to be described, it is preferable that the brackets 44 are slidably secured to the baffle 38, so that the distance between adjacent brackets 44 may be adjusted.

For large screens or where heavy materials are involved, it is advisable to provide supports for the springs intermediate the support blocks 22. A suitable intermediate supporting arrangement is shown in Figure 3. The intermediate supporting means includes a plurality of spaced bars 46 extending parallel to the springs 12 and secured to the side members 18 and 20, the spaced bars 46 cooperating to support normally extending T-rails 48 capped by a flange 50 adapted to engage and support at least one convolution of each of the parallel springs 12. A plurality of such T-rails 48 may be provided in the frame 16, the number employed depending upon the load to be supported by the screen.

It is apparent that by rotating the several threaded shafts 32, a compressive or tensive force may be applied to the springs 12. By varying, in this manner, the separation between the support blocks 22 at the opposite ends of the springs 12, the separation between the individual spaced rods 10 of the screen may be varied uniformly. The pivotally secured baffle 38 moves with the support blocks 22, so as to always guide material along the screen.

The resilient supporting blocks 22 at the ends of the springs 12 facilitate the mesh or porosity adjustment by making it unnecessary to adjust each of the threaded shafts 32 exactly. Any error in adjustment of the shaft 32 is absorbed by the yielding support blocks 22 allowing the rods 10 to remain parallel without any excessive strain on the springs 12.

In many applications it is desirable to operate the screens under either tension or compression so as to obtain the greatest possible latitude in porosity adjustments. Figure 5 shows a first modification of the screen support block identified by the reference numeral 52. The modification includes a pair of parallel discs 54 and 56, the disc 54 being adapted to engage the spring 12 and the disc 56 being rotatably secured to the threaded shaft 32. A pair of pins 58 project from the disc 54 through suitable apertures in the disc 56, each pin being provided with an annular flange 60 at the end thereof adapted to retain a spring 62 disposed between the disc 56 and said flange. A second spring 64 is mounted on each pin 58 between the discs 54 and 56. By this means, the disc 54 is yieldingly secured in spaced relation to the disc 56. Clearly, when the spring 12 is placed under either tension or compression, the springs 62 and 64 operate to permit self-alignment of the support rods 10.

A second modification of the support blocks for the springs 12 is illustrated in Figure 6. This support block includes a cup-shaped member 67 rigidly secured at its outer base surface to a threaded shaft 68. Engaging the threaded shaft 68 is a nut 70 provided with an annular groove 72 receiving a bearing 74 seated in the side member 18. The support block could, of course, be similarly mounted in the side member 20.

The nut 70 is provided with a tooled portion 76 adapted for manual rotation. By rotating the nut 70, the shaft 68 can be moved laterally relative to the side member 18 without any rotation of the shaft.

Secured to the inner base surface of the cup-shaped member 67 opposite the shaft 68 is a normally projecting tubular sleeve 78 slidably supporting a cup-shaped member 80 disposed in parallel opposing relation to the cup-shaped member 67. The cup-shaped members 67 and 80 are supported yieldingly in spaced relation by an elastomeric cylinder 82 disposed therebetween.

A pair of pins 84, rigidly secured to the inner base surface of the member 67, project normally through suitable apertures in the base of the opposing member 80. The pins 84 each terminate in a threaded portion 86 adapted to engage a nut 88 for retaining a spring 90. The springs 90 operate to bias the member 80 against the elastomeric cylinder 82.

The spring 12 is welded, or otherwise secured, to the member 80 in concentric relation to the sleeve 78. Clearly, if the nut 70 is rotated so as to place the spring 12 under tension, the springs 90 are compressed, and if the nut 70 is rotated so as to place the spring 12 under compression, the elastomeric cylinder 82 is compressed. The yielding nature of this support block thus permits self-alignment of the rods 10 supported by the springs 12.

The modification of Figure 6 further illustrates a modified supporting means for absorbing the weight of the material placed upon the screen. A support rod 92 is journalled for reciprocating motion in the tubular sleeve 78 and biased outwardly thereof by a spring 94. When the rod 92 is employed for support, a complementary support block is provided in the opposite side member 20, so that the rod 92 is biased by the springs 94 on the opposite ends thereof into a central position with respect to the side members 18 and 20. The rods 92 passing through the springs 12 provide a support for the springs without materially limiting the porosity adjustment of the screen. With this arrangement, the supporting elements 46, 48 and 50 may be removed from the frame 16. When it is desired to develop the screen to shapes other than planar shapes, the rods 92 may be preformed as required.

A modified baffle arrangement is also illustrated in Figure 6. An upright baffle 96 is pivotally secured to the cup-shaped member 80 by rivets 98, the baffle 96 functioning primarily to retain material on the screen when the flow of the material on the screen is parallel to the rods 10. An additional baffle 100 provided with a lug 102 is pivotally mounted thereby to an angular bracket 104 which, in turn, is pivotally secured to a lug 106 attached to the cup-shaped member 67. The baffle 100 may be pivoted to any desired angle relative to the plane of the screen so as to guide material onto the screen when it is desired that the material flow transversely of the rods 10.

The feature of adjustable porosity or mesh in the screen is particularly important in sizing applications where periodic changes in screen porosity must be made, as in the sizing of grain. The change of porosity of the screen disclosed herein may be over a wide range measuring from inches to thousands of an inch.

The adjustment feature also provides for rapid clearing of a blinded screen, the clogged particles being readily freed from the screen by temporarily increasing the porosity of the screen.

In many applications, the screen may be mounted upon a vibratory support. The vibration of the support causes the rods to oscillate, periodically increasing and decreasing the porosity of the screen, thus tending to reduce clogging or blinding. Similarly, even with stationary supports, the impact of the load on the screen will initiate vibration, tending to reduce blinding. The amount of vibration of the screen can be controlled within desired limits by adjusting the stiffness of the individual springs 12.

In some instances, it is desired merely to drain water from the load placed on the screen, as in draining paper pulp. Here, the tendency of the screen to blind is of extreme importance. Since this screen employs no cross bars other than the spring convolutions, blinding of materials such as paper pulp is kept to a minimum. By using springs of large diameter, there is provided ample clearance between the rods 10 and the convolutions of the spring 12.

A special adaptation of the screen and frame of this invention is illustrated in Figure 4. In this adaptation, the adjustment shafts 32 have been adjusted to throw the rods 10 out of parallel to provide a fan-like appearance, the screen having thereby a plurality of tapered openings. It is apparent that when the fan-like adjustment is extreme, both the rods 10 and the baffle 38 must be slidably mounted, as described hereinbefore, to compensate for the increasing separation between consecutive convolutions of adjacent springs 12.

When a load is placed upon the fan-shaped screen of Figure 4 for sifting or grading purposes, it is apparent that the larger pellets in the load, which may comprise iron ore pellets, for example, would be forced outwardly toward the larger openings under pressure of the flowing load. This produces a self-freeing surface for materials that would otherwise clog and blind the screen.

In the present invention, the supporting springs 12, as well as the rods 10, may be varied in section to meet varying conditions for different applications. Thus, the screen components may be round, triangular, square, or of any other desired section.

For many applications in existing screening equipment, the screen and frame herein described may be substituted directly for screens currently in use. In other installations, however, the screen may be provided with any other suitable frame, it being apparent that the adaptability of the screen is unlimited.

Although the preferred embodiment of the device has been described, it will be understood that within the purview of this invention various changes may be made in the form, details, proportion and arrangement of parts, the combination thereof and mode of operation, which generally stated consist in a device capable of carrying out the objects set forth, as disclosed and defined in the appended claims.

Having thus described my invention, I claim:

1. A screen including a plurality of similar spiral springs arranged in spaced parallel relation, a plurality of spaced rods extending transversely of said springs, and means including a plurality of eyelets one projecting from each convolution of each said spring and pivotally secured thereto for pivotally securing said rods to said springs, the eyelets of each spring being spaced one convolution apart and the rods being secured by said eyelets to adjacent convolutions of each spring so as to be spaced one convolution apart, said eyelets slidably engaging said rods.

2. A screen assembly comprising, in combination, a screen including a plurality of spaced substantially parallel coplanar spiral springs of substantially duplicate construction, a plurality of spaced rods disposed substantially in one plane extending transversely of said springs, means for securing each said rod to the perimeter of each said spring, said rods being spaced one convolution apart upon each said spring, and a plurality of yieldable support means each including a pair of opposing parallel disc elements and resilient means supporting said elements in spaced relationship, there being one disc element of each said support means engaging one end of each of said springs.

3. A device for supporting an adjustable screen, said device comprising a plurality of yieldable support blocks, frame means for supporting said blocks in spaced aligned pairs, said screen being suspended between the aligned pairs of support blocks, each said support block including a pair of opposing elements, and yielding means for supporting said elements in spaced relation, one of the elements of each support block engaging said screen, the other element of each support block being supported by said frame means, and means for adjusting the spacing between the spaced pairs of support blocks.

4. The device according to claim 3, wherein the yielding means for supporting the opposing elements of each support block includes resilient means disposed between said elements, a pin rigidly secured to one of said elements and projecting through the other of said elements, and spring means retained by said pin biasing the other of said elements against said resilient means.

5. The device according to claim 3, wherein each support block is provided with a rigidly secured tubular sleeve member for supporting a rod, said device including a plurality of said rods, there being one rod extending between each pair of spaced support blocks and supported thereby, said rods cooperating to support said screen against the weight of material deposited thereon.

6. The device according to claim 3, wherein each support block is provided with a rigidly secured tubular sleeve member, said device including a plurality of rods, there being one rod extending between each pair of spaced support blocks and journalled for reciprocating movement in the tubular sleeves carried thereby, and a plurality of springs, there being one spring disposed in each said tubular sleeve adjacent the rod journalled therein, said springs cooperating to center the rods between the pairs of spaced support blocks, said rods cooperating to support said screen against the weight of material deposited thereon.

7. A screening device comprising, in combination, a screen including a plurality of spaced substantially parallel bars defining a plane and a plurality of spiral springs disposed transversely of said bars, eyelet means slidably receiving said bars for pivotally securing said bars to the perimeter of each spring, the separation between the several adjacent bars secured to each said spring being substantially constant, said springs cooperating to support said bars in a developable plane, and frame means engaging the opposite ends of said springs for supporting said screen, said frame means including means for flexing said springs differentially to provide for variation of the spacing between said bars along the length of the screen.

8. The screening device according to claim 7, wherein the bars of said screen are pivotally secured to the peripheries of said springs at points spaced one convolution apart.

9. A screen including a plurality of spaced parallel substantially coplanar rods, a plurality of spring elements, there being one spring element extending transversely between each pair of adjacent rods, and means for pivotally securing the spring elements to the rods, said means slidably engaging said rods whereby said rods are slidably, as well as pivotally, secured to the spring elements.

References Cited in the file of this patent

UNITED STATES PATENTS

| | | |
|---|---|---|
| 170,440 | Fitzpatrick | Nov. 30, 1875 |
| 242,956 | Morris | June 14, 1881 |

FOREIGN PATENTS

| | | |
|---|---|---|
| 5,603 | Great Britain | Apr. 22, 1886 |
| 13,685 | Great Britain | Aug. 17, 1895 |
| 9,645 | Great Britain | May 8, 1905 |
| 588,222 | Great Britain | May 16, 1947 |
| 76,426 | Austria | May 10, 1919 |